United States Patent [19]

Busboom et al.

[11] Patent Number: 5,437,014
[45] Date of Patent: Jul. 25, 1995

[54] SYSTEM FOR SUPPORTING MOUSE BUTTON EVENTS OF DEPENDENT WORKSTATION TERMINALS CONNECTED TO MAIN PROCESSOR EXECUTING MULTIPLE APPLICATION PROGRAMS

[75] Inventors: Leah J. H. Busboom, Oronoco; Stephen T. Eagen; Harvey G. Kiel, both of Rochester; Raymond F. Romon, Oronoco; Jeffery J. Van Heuklon, Rochester, all of Minn.

[73] Assignee: International Business Machines Corporation, Armonk, N.Y.

[21] Appl. No.: 816,424

[22] Filed: Dec. 31, 1991

[51] Int. Cl.⁶ .................................................. G06F 15/02
[52] U.S. Cl. ...................................... 395/275; 395/155; 364/236.8; 364/237.2; 364/929.12; 364/DIG. 1
[58] Field of Search ............... 340/706, 709, 710, 712, 340/711, 717, 718, 720, 721, 723; 395/275, 200, 153, 155, 162, 163, 156, 161, 149, 148, 157, 158; 364/236.8, 237.2, 929.12

[56] References Cited

U.S. PATENT DOCUMENTS

| | | | |
|---|---|---|---|
| 4,755,808 | 7/1988 | Bullock et al. | 340/709 |
| 4,772,882 | 9/1988 | Mical | 340/710 |
| 4,845,644 | 7/1989 | Anthias et al. | 364/521 |
| 4,859,995 | 8/1989 | Hansen et al. | 340/710 |
| 4,860,247 | 8/1989 | Uchida et al. | 364/900 |
| 4,901,223 | 2/1990 | Rhyne | 364/200 |
| 4,965,559 | 10/1990 | Dye | 340/717 |
| 4,974,173 | 11/1990 | Stefik et al. | 364/521 |
| 5,058,056 | 10/1991 | Hammer et al. | 364/926.9 |
| 5,179,652 | 1/1993 | Rozmanith et al. | 395/155 |
| 5,198,802 | 3/1993 | Bertram | 340/709 |
| 5,208,912 | 5/1993 | Nakayama et al. | 395/200 |
| 5,220,663 | 6/1993 | Banchot et al. | 395/575 |
| 5,230,063 | 7/1993 | Hoeber et al. | 395/156 |
| 5,247,615 | 9/1993 | Mori et al. | 395/200 |
| 5,297,032 | 3/1994 | Trojan et al. | 364/408 |

FOREIGN PATENT DOCUMENTS 0438018  12/1990  European Pat. Off. .

OTHER PUBLICATIONS

Information Processing 68, vol. 2, 1969, Amsterdam, NL, pp. 692–703, G A Rose, "Computer Graphics Communication Systems".

*Primary Examiner*—Thomas C. Lee
*Assistant Examiner*—Moustafa M. Meky
*Attorney, Agent, or Firm*—J. Michael Anglin

[57] ABSTRACT

A dependent, nonprogrammable, character-based workstation terminal (DWS) supports a mouse. A terminal controller entirely within the DWS processes and displays mouse motions, but sends mouse button actuations, with the current mouse position, to a single workstation controller (WSC) handling many DWS'. The WSC processes the actuations according to a set of rules, and sends data streams to a main processor (MP) serving multiple WSCs. The MP executes user application programs, partially in response to data streams representing mouse events. The MP executes user application programs, partially in response to data streams representing mouse events. The MP may also send mouse rule sets to the WSCs in data streams.

34 Claims, 8 Drawing Sheets

SYSTEM FOR SUPPORTING MOUSE BUTTON EVENTS OF DEPENDENT WORKSTATION TERMINALS CONNECTED TO MAIN PROCESSOR EXECUTING MULTIPLE APPLICATION PROGRAMS

BACKGROUND OF THE INVENTION

The present invention relates to electronic data-processing systems, and more particularly concerns provision for using a pointing device such as a mouse in each of multiple character-based dependent workstations or dumb terminals controlled by a single processor or workstation controller.

Interactive application programs and systems have undergone a swarm to more natural forms of user interaction. Personal computers and intelligent workstations are rife with informative display configurations and with non-keyboard input devices. The pointing device known as a mouse is especially favored by software and system designers. This device—and close cousins such as the trackball, the trackpoint, and the digitizing tablet—has a body which a user can move across a surface, and one or more buttons or other controls on the body which the user can actuate. Motion of the mouse produces a corresponding motion of a mouse cursor or similar symbol on the display screen which points to an element of the information on the screen. Actuation of a button signals the application program or some other part of the system to perform a function defined by the type of actuation and by the program. For example, a press and release (a "click") of a mouse's left button while the mouse cursor points to a data-entry display field might signal the presentation-manager program of a personal computer to move a data cursor to that field. Two press-release cycles within a short time (a "double click") could transmit data entered in the entry field to the application program. Other actuations, such as "drag and drop" (moving the mouse with a button held down) are also known in the art. In the sequel, the term "mouse" will be used as a generic term including all such pointing devices.

One large group of users has been left behind in the mass migration to pointing devices. Most midrange and mainframe computer systems connect to dozens, hundreds, or even thousands of inexpensive terminals known as dependent, nonprogrammable, or dumb terminals, which will be collectively referred to as DWSs. Such terminals do contain programmable microprocessors, but they do not themselves perform an application program for the user. Multiple DWSs may connect directly to the main processor of the system, or to a workstation controller (WSC). One or more WSCs may connect locally or remotely to the main processor which ultimately executes application programs. The WSC or the main processor, collectively the central or host processor, communicate with each DWS by means of data frames which specify the exact layout of data on the DWS's display, and which receive individual keystrokes or other user actions and status messages from the DWS. Also, DWSs are typically character-oriented; they do not have graphic interfaces. That is, the display screen is permanently organized as a number of rows and columns of characters. The different character patterns which can be displayed are defined by patterns in a character generator in the DWS; although multiple or extended character sets can sometimes be defined statically or under indirect host control, only certain character or symbol patterns can be positioned on the screen, and only at predefined locations on the screen. (Although a few DWS terminals support rudimentary "graphics" comprising line elements, circle elements, and so on, no known character-based DWS supports a graphical user interface. So-called X-terminals, which do support graphical interfaces, are not character-based; their screens are internally all-points-addressable, or APA.)

Supporting a mouse or similar pointing device requires a dense flow of data. The supporting processor must sample the mouse many times per second (usually in the range of 20 to 200) to detect motion of the mouse body and actuation of the buttons. The presentation manager or application program must move the mouse cursor on the display fast enough and often enough to avoid distracting delays and jerks, and must react quickly to button operations.

The conventional solution is to implement mouse functions only within intelligent workstation (IWS) terminals, along with the application programs; the wide bandwidth between the IWS processor and its display and input devices allow the user to perceive the necessary feedback from mouse events substantially in real time. However, IWS terminals are expensive. Although the internal processing power of both will increase greatly, IWS terminals will probably remain double or triple the price of DWSs for the foreseeable future.

The straightforward approach for supporting a mouse on a DWS would be to send data frames from the DWS to the host (main processor directly or through a WSC), detect motion and actuation there, and to return data frames to the DWS for moving the mouse cursor and/or performing any other operation at the terminal. However, the data rates for managing a number of DWS mice would quickly overwhelm the bandwidth of the cable or other medium connecting the terminals to the host, and would overwhelm the host processor as well.

SUMMARY OF THE INVENTION

The present invention provides support for a mouse or similar pointing device on inexpensive dependent workstations (DWSs) without significantly increasing the cost of the DWS and without significantly increasing the amount of data communicated to the host processor of a system having a large number of such terminals attached.

Such mouse support is also achieved without hardware modifications to the host processor and in a simple manner with respect to application programs. The invention accommodates in an especially simple manner the use of a workstation controller (WSC) separate from the main processor in the system; such a controller can handle multiple DWSs executing different main-processor applications programs.

In short, the present invention makes feasible the use of a mouse on a nonprogrammable or dependent terminal. Thereby, it provides many of the benefits of modern user interfaces to the world of midrange and mainframe data-processing systems. The invention accomplishes these and other goals by splitting the handling of mouse-support functions between the local DWS terminals and the host processor in a novel manner.

A data-processing system according to the invention includes a host processor for executing a plurality of application programs and for managing a large number of nonprogrammable or dependent workstations. The host may be split into a main processor which actually executes user application programs and a workstation controller (WSC) which manages a number of DWS terminals and communicates with the main processor. A communications medium carries individual data frames between the hoist (either the main processor itself or the WSC) and a large number of physically separate dependent terminals. The terminals contain a display, a keyboard for primary data input from a user, and a mouse or similar pointing device. Controllers in the DWS terminals store current positions of the mouse, and show this position on the display, but need not transmit mouse movements to the host processor. When the operator actuates a button or similar control on the mouse, the terminal sends the current mouse position and the nature of the "mouse event" to the system host. The host (main processor and/or workstation controller) then decides what action to perform, and what, if any, data to return to the terminal.

DESCRIPTION OF THE PREFERRED EMBODIMENT

Figure 1:
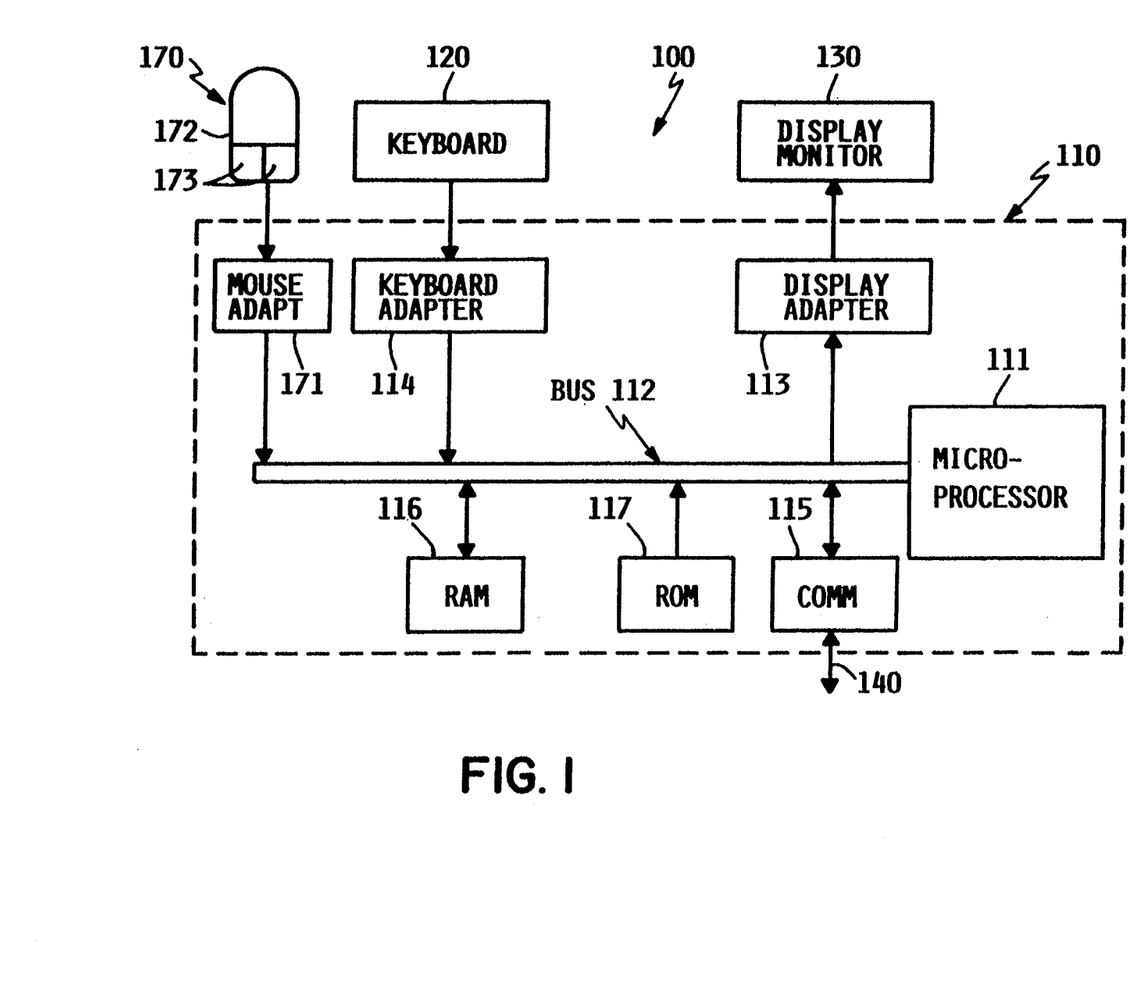
FIG.1 is a block diagram of a typical dependent workstation (DWS), including a mouse according to the present invention.

FIG. 1 is a high-level block diagram of a dependent workstation (DWS) 100 modified according to the invention. A controller 110 in a physical enclosure has a microprocessor 111 having a bus 112 connected to several adapters for enabling communications with a limited number of external devices. For example, keyboard adapter 114 enables communication between the microprocessor and a keyboard 120 for allowing a user to input characters. Display adapter 113 enables information to be transferred to a display monitor 130. Communications adapter 115 transfers signals between the DWS 100 and a workstation controller (WSC) via a cable or other conventional medium 140. Random-access memory (RAM) 116 attaches-to bus 112 for storing modifiable data within the terminal; it typically contains a screen buffer. Read-only memory 117 stores fixed program code for the largely conventional terminal-control program which supervises the internal functions of DWS 100; such functions include power-on processing, diagnostics, communications routines, and a conventional character generator for producing display patterns for each of a number of characters in a character set, or in multiple selectable sets.

In the present invention, DWS 100 also includes a conventional mouse 170, attached to an adapter 171 within terminal controller 110. The mouse has a movable hand-held body 172 which generates conventional "position event" signals indicating how far an operator moves it. The mouse also has a number (usually 1, 2 or 3) of buttons 173 which the operator can selectively press and release; each press and each release of each button generates a distinctive "button event" signal to the microprocessor by way of adapter 171 and bus 112. Similar pointing devices, such as trackballs, can be used in the same way; such devices often attach in the same way as a mouse, and some even directly emulate a mouse interface. Therefore, such devices are equivalent to a mouse for the present purpose, and could be substituted for a mouse in the following description.

A DWS such as 100 is referred to as "dependent" because it cannot perform any useful functions independently of a host processor in a system. It is also sometimes referred to as a dumb terminal or a nonprogrammable terminal. The other broad class of terminals is sometimes referred to as smart terminals or intelligent workstations (IWS); this class also includes personal computers. The difference between these two broad classes cannot be stated solely in terms of internal processing power. To paraphrase an old definition, a terminal is not dumb because it is ignorant, but because it cannot be educated. That is, a DWS always operates the same way, whereas an IWS either itself directly performs a user's application programs or at least modifies its operation significantly in response to the system's performance of different application programs. Typically, a DWS is incapable of any significant internal processing beyond that necessary to interface with the keyboard and display monitor and to communicate with the system. Therefore, all the information displayed on the monitor must be provided via the communications adapter to the RAM. Similarly, all user keystrokes from the keyboard are temporarily stored in RAM and then transmitted over the cable to the system. One of the major factors in lowering the cost of DWS terminals is that most of them are strictly character-oriented; that is, their display screens are organized as rows and columns of characters taken from a set produced by a character generator. Although different sets can sometimes be stored internally or downloaded, the characters and symbols which can be displayed in any screen are taken strictly from the set in force at that time. In the preferred embodiment, DWS 100 is based upon the IBM 5250 family of terminals, augmented by mouse hardware 170 and a relatively small amount of code in ROM 117 for supporting the mouse. Many other terminal types can be easily modified to include the invention.

In the preferred data-processing system, the host processor includes a main processor which actually executes user application programs, and one or more WSC processors. A typical large system may contain up to thirty or forty WSCs. A conventional WSC provides information transfer and control for multiple DWSs 100. A typical WSC may control eight cables 140, and each cable may connect to seven DWSs each having an address by which it is known to the WSC. The WSC function is usually performed by a hardware and software package which is uniquely identified and physically separate from the main-processor hardware and software packages. The WSC hardware is typically contained on one or more circuit boards plugged into a card slot in the physical enclosure of the host processor or central electronic complex of the system. The WSC software is executed by the WSC hardware independently of software executed on the main processor.

If a WSC is physically incorporated into a host processor or mainframe as a card or other pluggable package, the WSC may communicate directly with the main processor using a backplane bus or channel associated with the host processor. The WSC can also be physically constructed in a standalone enclosure with its own power and other facilities for operation remotely from the main processor. In this case, the WSC communicates with the main processor via a conventional communications line, using any one of a number of standard protocols, such as IBM Systems Network Architecture (SNA). In this way, a WSC can control one or more cable-connected groups of DWSs at physical locations arbitrarily distant form the main processor. (On the other hand, the poll-response limits between a WSC and its DWSs usually limits the distance between these units to, about 1500 meters.

Figure 2:
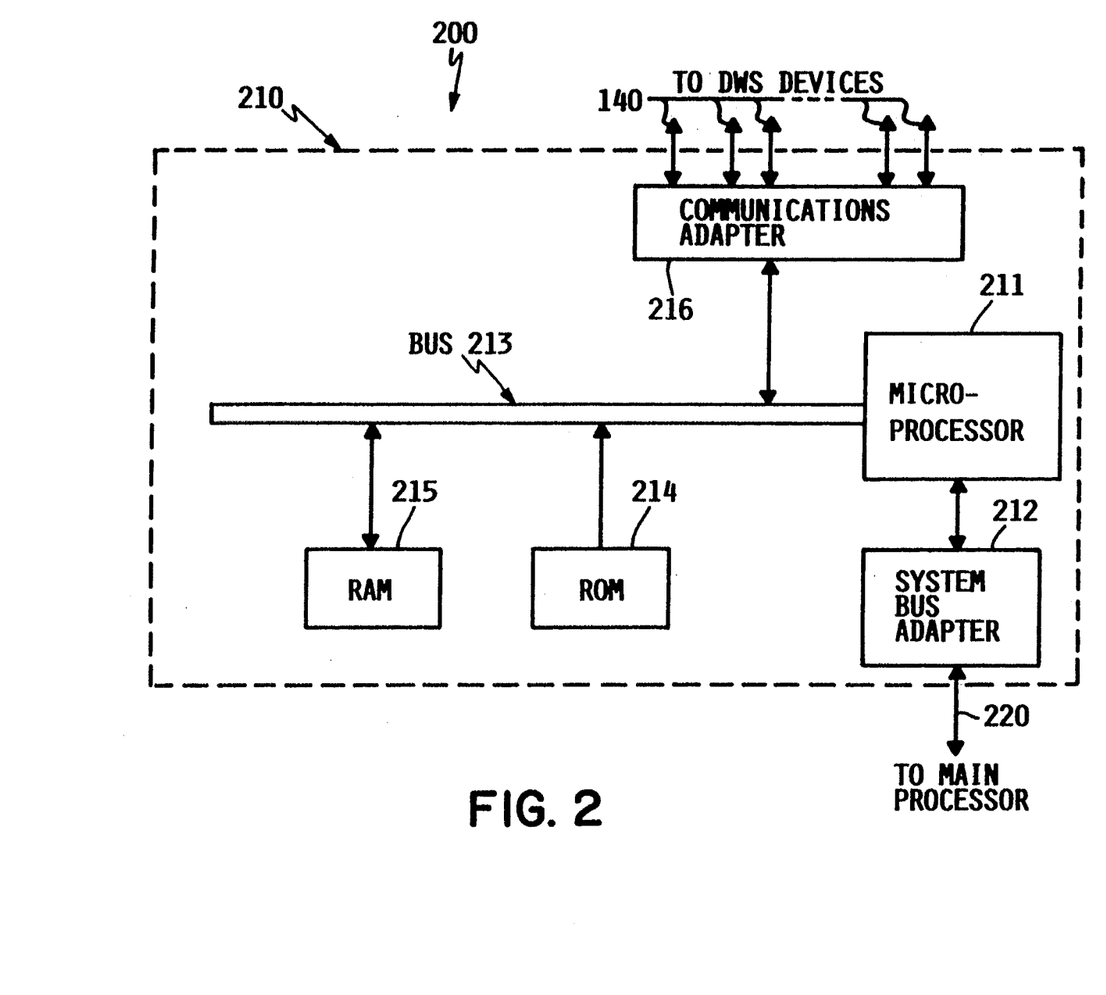
FIG. 2 is a block diagram of a typical workstation controller (WSC).

FIG. 2 is a block diagram of a WSC 200 of the type which communicates with multiple DWS devices 100. The WSC has a number of circuits contained within a physical enclosure 210. A microprocessor 211 is in this embodiment conventionally connected to a system bus adapter 212 which plugs into a system or backplane bus 220 coupled to the main processor. The WSC also has an internal bus 213 coupled to ROM 214 and RAM 215. In addition to containing conventional code for controlling WSC 200, ROM 214 contains code for mouse support, as will be described. RAM 215 holds conventional data buffers and other modifiable information; in addition, RAM 215 may contain rules and other data for processing mouse events according to the invention. Internal bus 213 also connects to communications adapter 216 for connecting to a large number of DWSs 100 via a number of cables 140 or other conventional media.

Data frames containing keystroke signals from all connected DWSs are received by WSC 200 and stored within RAM 215 for subsequent communication to the main processor of the system or for internal processing by the WSC itself. In a preferred embodiment, the WSC is a feature card for an IBM AS/400 data processing system; as mentioned above, however, the WSC can be embodied remotely from the main processor, as for example, an IBM 5394 communications controller.

Figure 3:
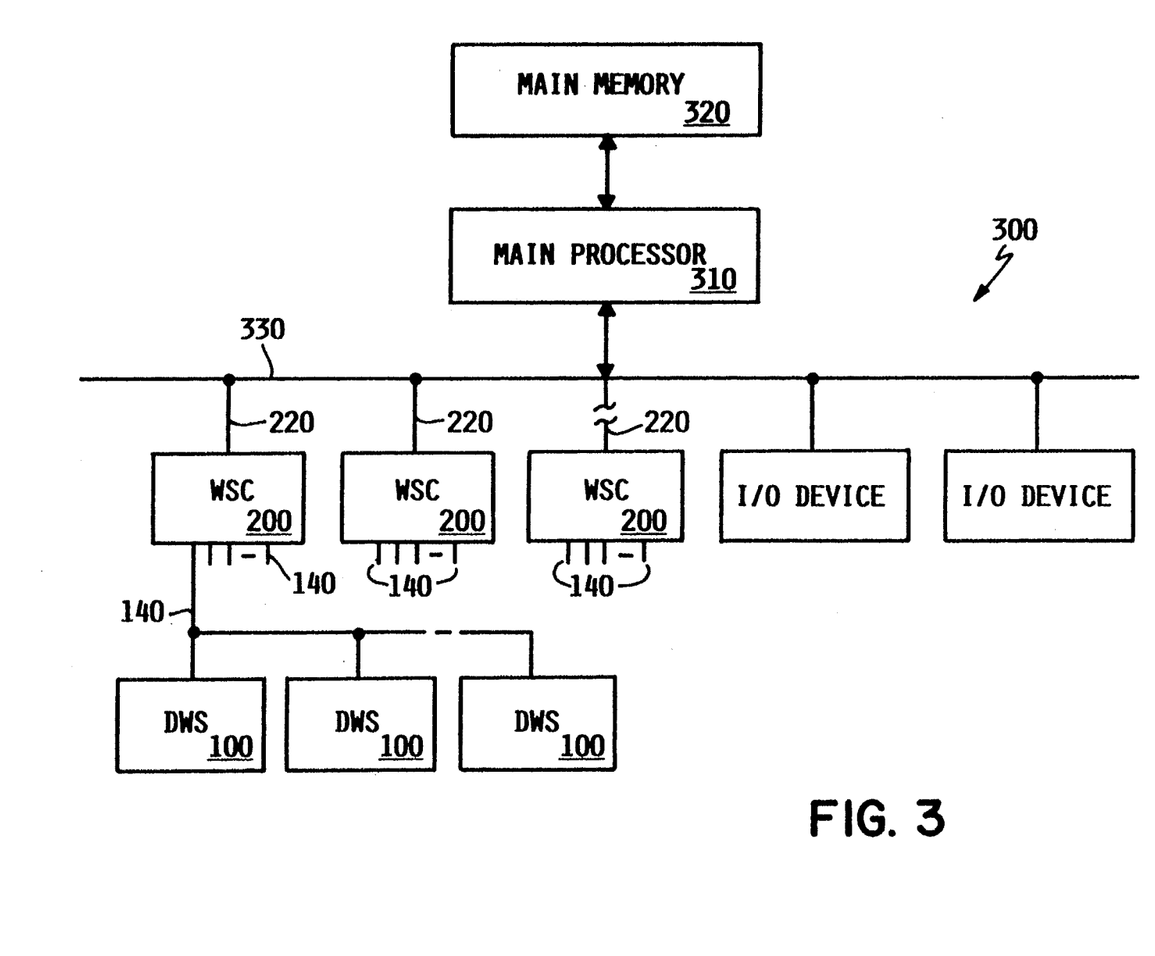
FIG. 3 is a block diagram of a typical data processing system including the components of FIGS. 1 and 2.

FIG. 3 is a block diagram of the entire system 300. Main processor 310 executes application programs stored in main system RAM 320, and connects to a backplane I/O bus 330. Bus 330 connects multiple devices 140, such as disk drives, tape drives, and communications channels. WSC 200 connects to this bus via line 220. Again, the IBM AS/400 is an example of such a system 300.

In the environment of the invention, main processor 310 constructs a "data stream" for communicating information from an application program to the appropriate terminal 100. Each data stream moves from processor 310 to WSC 200, and contains information representing the screen display and entry-field definitions. The WSC retains this information in a section of its RAM 215, FIG. 2, identified with a particular DWS 100. The WSC then transfers the screen display data to the appropriate DWS in a data frame. Whenever the user at thee DWS makes a keystroke, the DWS signals the WSC that a keystroke is available after receiving the next poll from the WSC. The WSC periodically polls all DWS terminals, and those having a keystroke transfer it to the WSC at that time in a data frame called a poll-response data frame. The present invention adds a new type of data frame to the conventional ones, for handling mouse events.

Figure 4:
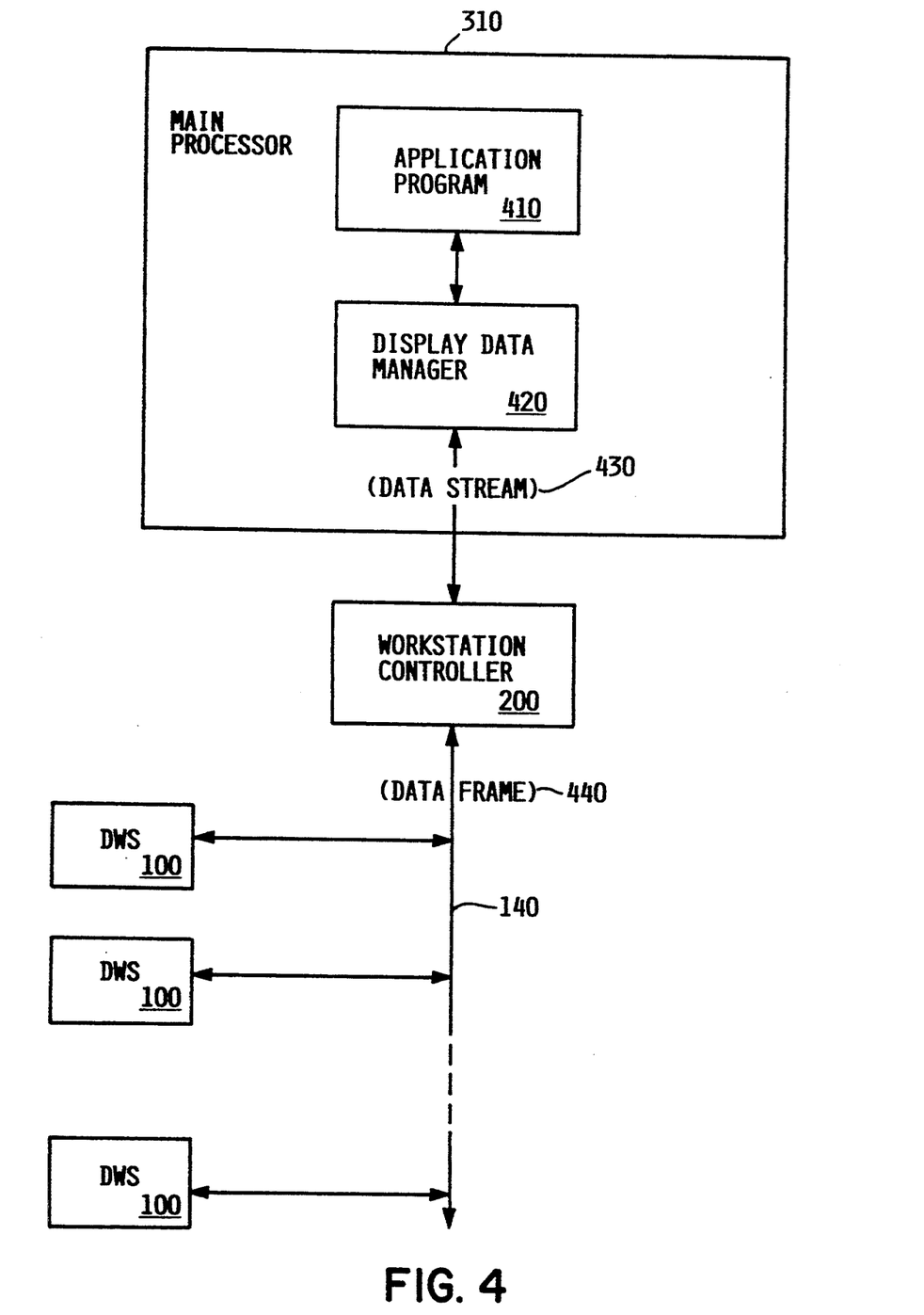
FIG. 4 is a high-level diagram illustrating the flow of display data in the system of FIG. 3.

FIG. 4 is a simplified block diagram illustrating the data flow in system 300. Main processor 310 executes interactive application programs 410 as, a part of its normal operating function. These application programs communicate from, time to time with the remote terminals connected in the overall system, both by processing keystroke data sent from the terminals and by generating display information to be transmitted to the terminals. When an application program 410 needs to communicate with a remote terminal 100, it calls upon a program for application program interface (API); one form of such a program is a conventional display data manager (DDM) 420. When information is to be displayed at the terminal, DDM 420 constructs a data stream 430 according to a conventional format, and transmits it to WSC 200. The WSC selectively interacts with the DWS devices 100, activates the appropriate device, and passes the information to be displayed in a data frame 440 to the selected device, which then displays it. Specific requirements for data streams for the IBM 5250 products are described in publicly available document SA21-9247-6, "IBM 5250 Information Display System—Functional reference Manual."

Figure 5:
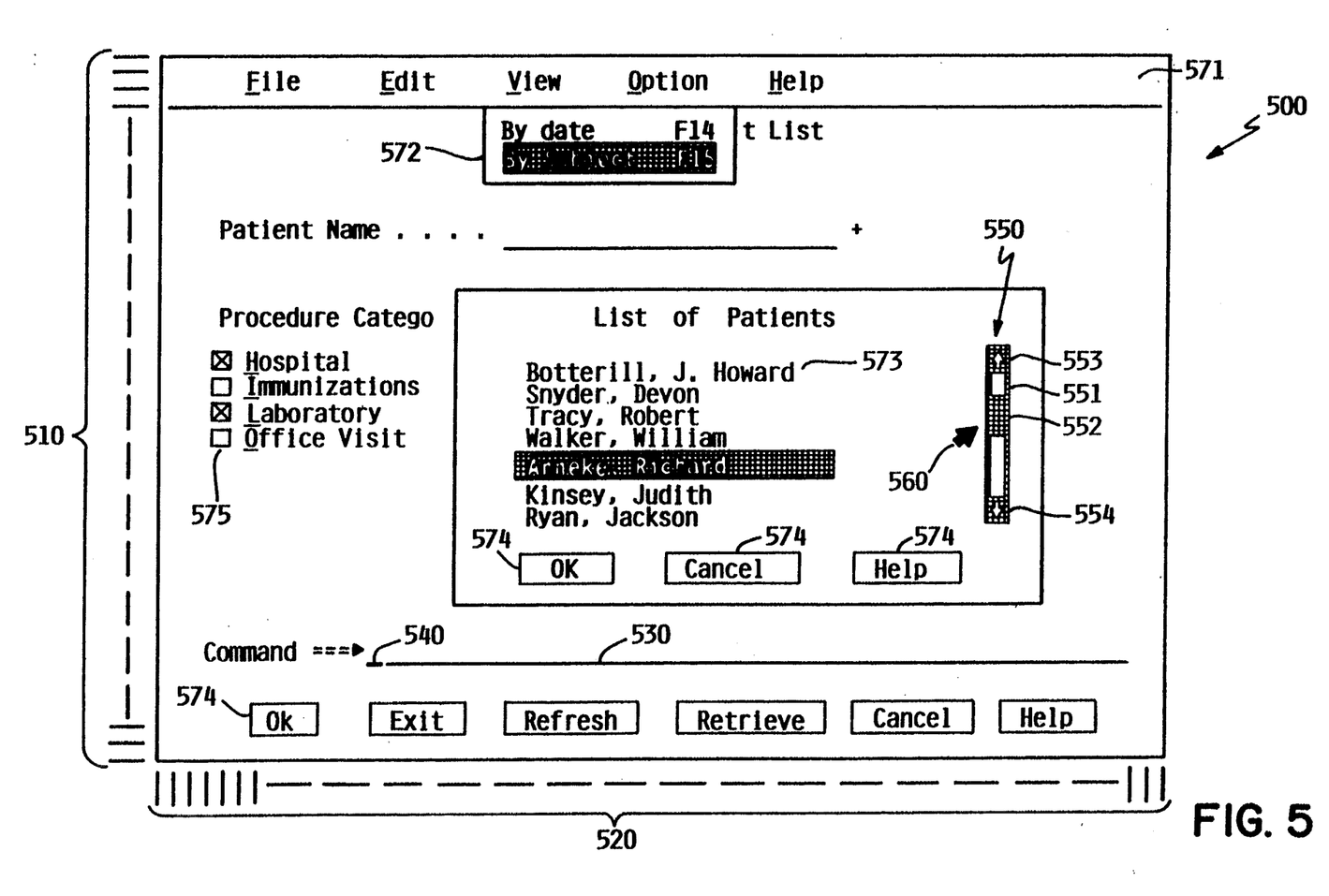
FIG. 5 shows an example of a display panel including both text and mouse cursors.

FIG. 5 is an example of a DWS display screen for a typical application program executing in the host computer. Character information is displayed in fixed rows, as indicated by the imaginary lines 510. Within each row, characters are displayed in fixed column positions, indicated by the imaginary lines 520. Conventional screens such as those of the IBM 5250 family display 24 rows of 80 columns each; other screens may display more rows and/or more columns. The application program may group certain rows and columns into fields, as at entry field 530, for example. Conventionally, a text cursor 540 indicates the row/column position where the next user character keystroke will appear.

The inclusion of a mouse allows a purely character-mode display to use many of the constructs of the newer graphical user interfaces (GUIs). For example, screen 500 may display a GUI-like scroll bar 550, made up of a number of special characters occupying one character row and column of the screen, and giving the appearance of a conventional graphical scroll bar. Specifically, a single column of open block characters 551 show the background of the scroll bar, while one or more filled block characters 552 indicates the current position of the scroll-bar slider. Up and down arrows 553 and 554 are defined characters which appear at the ends of the scroll bar. A mouse cursor 560 is a single special character on screen 500, and occupies a single character row and column; it could also be represented as a reverse-video image of the character already displayed at the mouse-cursor location, or in some other distinctive way. Positioning this mouse cursor at the different row/column locations of the characters forming scroll bar 550 and clicking the left mouse button causes the scroll-bar slider to appear to move by causing different characters to be displayed in its rows of text characters. "Clicking" a mouse button means a press of the button at a recognized row/column position. Typically, personal computers and intelligent workstations use several types of mouse button events to signify different actions. In addition to the single click, a "double click"

occurs when the button is pressed and released twice within a predetermined time duration. Some systems define a "drag" when the mouse is moved while the button is held down and later released at a different location.

The present invention allows a full set of GUI constructs in a purely character-based DWS. In addition to the scroll bar described above, FIG. 5 shows other character-based constructs which have the same appearance as GUI action bars or menu bars 571, pull-down menus 572, selection fields 573, control buttons 574, and selection boxes 575.

Figure 6:
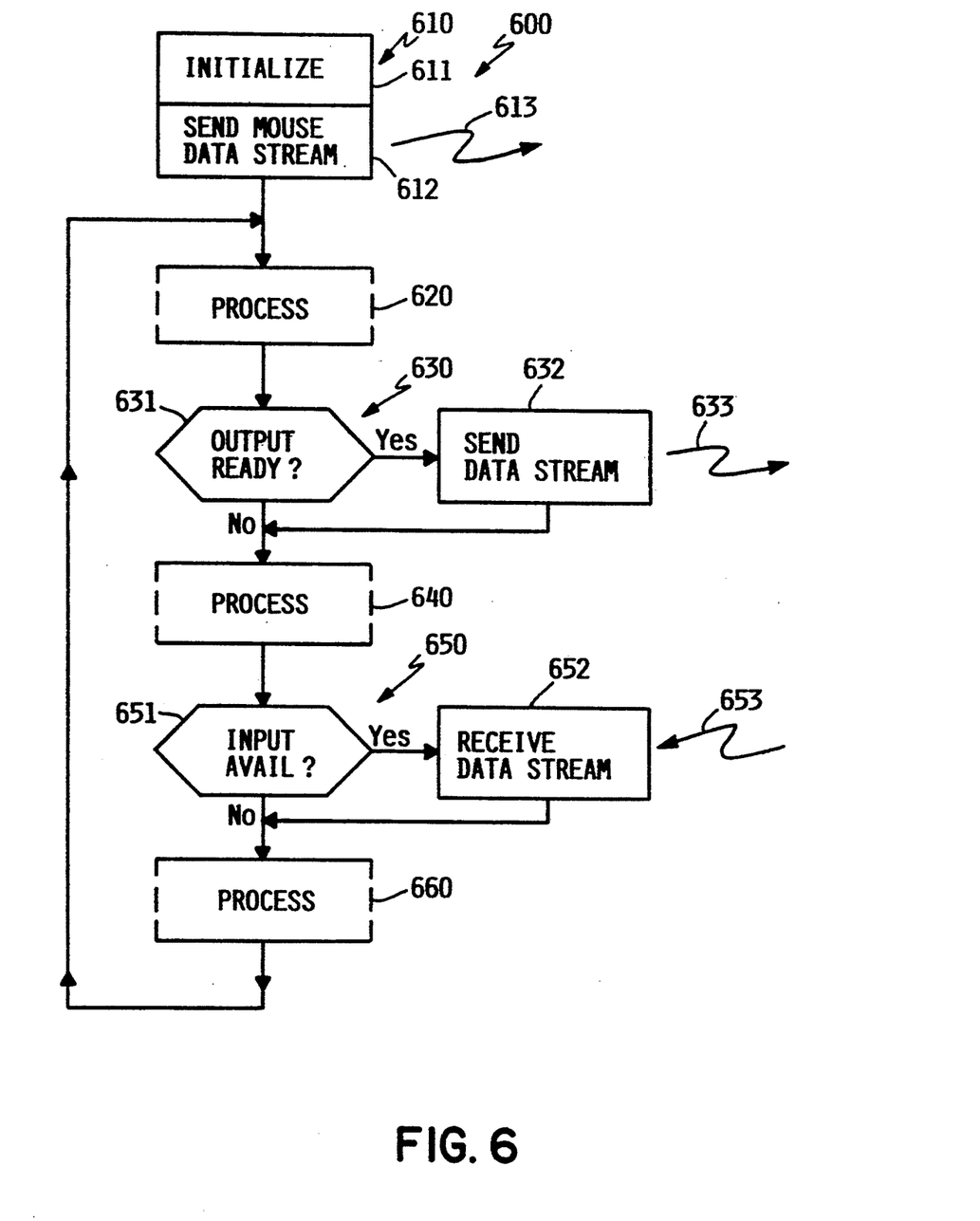
FIG. 6 is a flowchart outlining the operation of a typical application program executing in host processor of FIG. 3.

FIG. 6 is a high-level flowchart 600 of the operation of a typical application program 410 and display data manager 420, both running on the main processor 310 of the system host as shown in FIG. 4. FIG. 6 shows one instance of one application out of many running concurrently on the main processor; this instance is associated in a conventional manner with one of the DWS terminals attached to the WSC. When the particular instance of the application begins at 610, block 611 performs conventional initializing routines.

Among them, block 612 sends a data stream 613 to the WSC for defining the meanings to be associated with a number of mouse button events. This may be in the form of a decision tree or a set of rules to be stored in the WSC. In addition, the WSC may have a default set of rules which apply to any application for which this step is not performed; for example, known "screen-scraping" or "reverse-engineering" operations can be programmed to find the displays of various legends or fields on the screen, and to take a conventional action when a mouse button is pressed within the row/column locations of such fields. In addition, provision can be made for individual users to perform keyboard operations at their own DWS terminals to define their own individual sets of rules or profiles for their terminal sessions.

The following illustrate various types of functions which a user can perform with a DWS having a mouse.

For entry fields at certain locations on a display screen, an application program can indicate that clicking the left mouse button selects the field. When the user clicks the left button while the mouse cursor is located in a row and column defined for the entry field, the terminal sends this mouse event to the WSC in a poll-response data frame, and the WSC returns a data frame to the terminal causing the text cursor to move to the row/column location of the mouse cursor in the field, and sends to the main processor a data stream or "attention identifier" (AID) containing one of a number of values previously sent by the application to the WSC for identifying various fields. The application then sends text characters to the WSC for display on the terminal; these characters can provide mouse-driven context-sensitive or hypertext help text for the particular field represented by the value.

An application program can define GUI-like constructs such as scroll bars, menu bars, etc. in its outbound data streams to the WSC, and can receive inbound data streams or AIDs as a result of mouse-button events occurring while the mouse cursor is located within these constructs. The previously mentioned scroll bar 550, for example, can cause the application to take different predefined actions when the user clicks a mouse button on the slider shaft characters 551 or at the arrows 553, 554 on the ends of the shaft, or when the user presses a button on the slider 552 itself and drags the slider with the button held down. When the WSC receives an outbound data stream defining a GUI-like construct, the WSC stores the type and row/column locations of the construct in its RAM.

For example, when the user clicks the left mouse button on an action-bar item, the DWS sends a mouse data frame to the WSC; the WSC then retrieves from its RAM the type of the construct (i.e., "action bar") and sends an AID to the main processor. The main processor then responds by sending an outbound data stream defining a pull-down menu. If the user clicks the left mouse button in a selection box such as 575, FIG. 5, the DWS sends a data frame to the WSC indicating which box was chosen. However, the WSC sends no AID data stream to the main processor at this time; the choice is selected by the WSC writing a filled check-box character to the DWS, replacing the empty check-box character. Later, when the user has clicked on all his choices in the field, he signals completion by pressing an "Enter" key on the keyboard, or clicking on an "OK" control button. When the WSC receives this keystroke, it assembles a list of all selection boxes chosen in the field, and at that point sends an AID to the main processor. This is called a "pending operation," as opposed to an "immediate operation" which sends an AID as soon as the user has performed a single mouse operation.

For certain applications, clicking a mouse button in a defined field can perform a "cut" operation by moving the characters in the field to the WSC; moving the mouse and clicking the button again can then "paste" the characters in another field by sending an appropriate display data frame back to the terminal. This cut-and-paste operation can be completely handled in a manner which is completely transparent to the application program running in the main processor.

Even conventional keyboard driven applications which are not mouse-aware can benefit from the present invention. This is done by providing a default set of mouse actions for the WSC. For example, many applications display legends such as "F12=CANCEL" at the bottom of screens. Then, if the user clicks the left mouse button (or whatever button is defined for this function) within the row and columns of that legend, the WSC detects this event and returns to the application a data stream containing an "F12" keystroke, just as though the user had pressed the function key labelled "F12" on the keyboard. The default actions can be loaded permanently into the WSC's ROM, or they can be downloaded into WSC RAM from the display data manager or some other source in the main processor. This is called the "screen-scraping mode."

Decision-tree logic of any known type determines what, if any, function is performed upon a mouse operation. As an illustration:

If the left mouse button is pressed,
  If the shift key is down, then move the text cursor to the row/column position of the mouse pointer.
  If a cut is pending, then perform a paste operation, and reset the cut-pending flag (see below).
  If the mouse cursor is on an action bar, pull-down menu, control button, or other GUI-like construct, then select the construct and send an AID to the application identifying the construct.
  If the mouse is on a vertical scroll bar,
    If on the up-arrow scroll-bar character, send roll-up one row command to application.
    If on the down arrow, send roll-down one row command to application.

If on the scroll-bar shaft above the slider, send roll-up command alone (i.e., application-dependent scroll amount).

If on the shaft below the slider, send roll-down command alone.

If the mouse is on a horizontal scroll bar,

If on the left-arrow character send roll-left one column command to application.

If on the right arrow, send roll-right one column command to application.

If on the shaft to the left of the slider, send roll-left command alone i.e., application-dependent scroll amount).

If on shaft to the right of the slider, send roll-right command alone.

If the mouse is on a selection field,

Select the item at the mouse-cursor position.

If the menu is a single-choice menu, then deselect all other items.

If the field is an entry field defined as a "left-button-down selectable field," then move the text cursor to the row and column of the mouse pointer and send an application-specified AID to the main processor.

Check for a reverse-engineering (screen-scraping) match; if it exists, then match the screen against the rules and the mouse-cursor location against defined functions, and transmit one or more appropriate keystrokes to the application program.

Otherwise, start a cut operation by reversing the image of the character at the position of the mouse cursor and recording the location of this character.

If the left button is released,

If a cut operation has been started and the mouse pointer is at a screen location at or beyond the location of the start of the cut, finish the cut operation and set a cut-pending flag.

Otherwise, reset the cut-started flag, undo the reverse-image character, if necessary, and take no further action.

Blocks 620 perform conventional function is within the application 600. Output to the WSC occurs at 630, when block 631 detects that the application needs to send a conventional data stream to the WSC. Block 632 packages and sends the data, as indicated at 633. More conventional processing occurs at 640. Input from the WSC occurs at 650. When block 651 determines that a data stream 653 is available from the WSC, block 652 receives it. Blocks 660 perform further functions, and return control to blocks 620, as long as the application is active. The major functional blocks 610–660 may be actually executed in any order.

Figure 7:
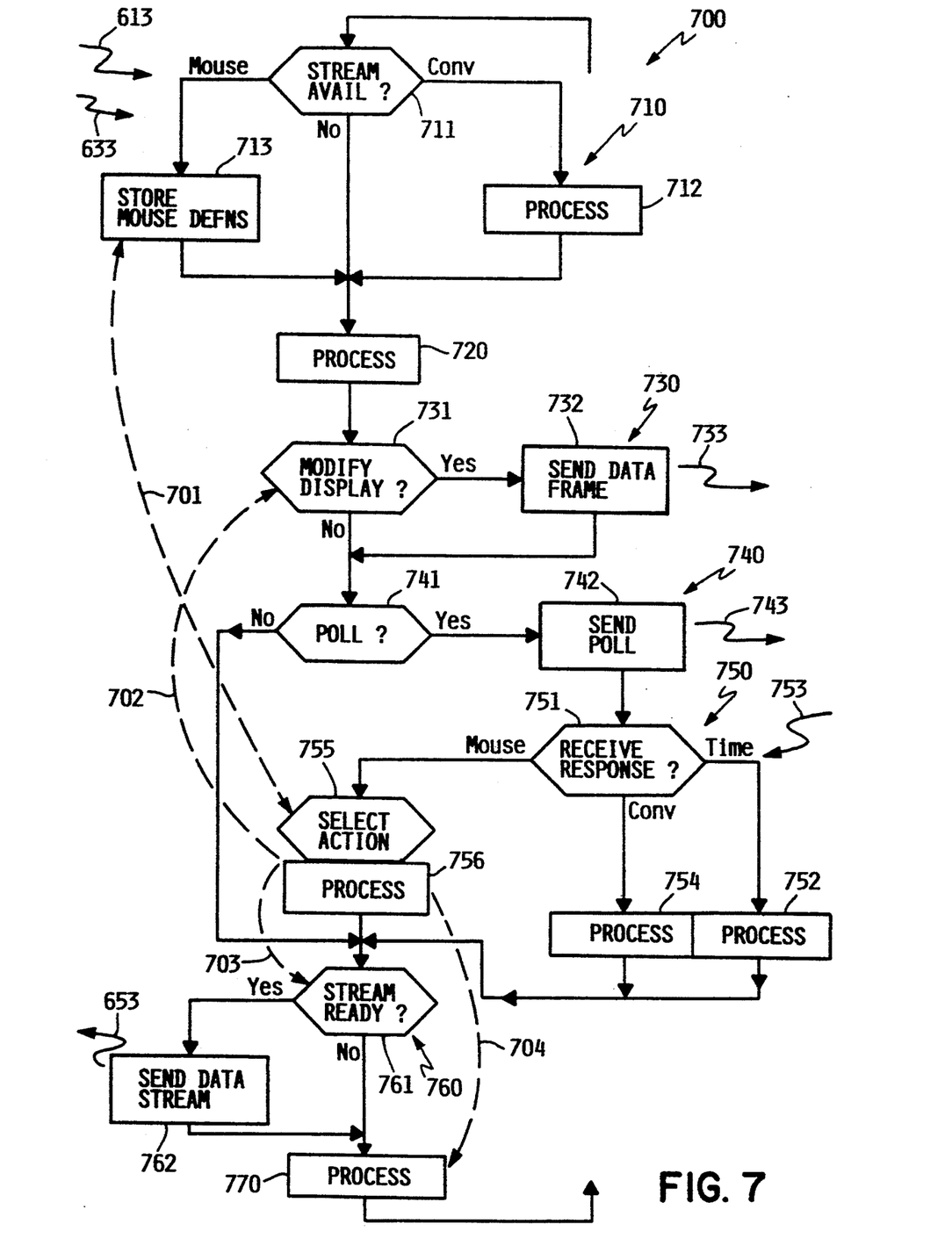
FIG. 7 is a flowchart showing the operation of the WSC controller of FIG. 2.

FIG. 7 is a flowchart 700 showing the operation of a WSC in carrying out an application program such as 600, FIG. 6. The WSC performs multiple instances of operation 700, one for each DWS terminal connected to it, in addition to certain conventional housekeeping operations of its own, not shown.

Blocks 710 receive data streams 613 and 633 from the host computer, FIG. 6. Block 711 detects that a data stream is available from the host. If it is a conventional stream such as 633, block 712 carries out any necessary operations. For a mouse-button-event definition stream 613, block 713 stores a representation of the events in the WSC such that the WSC controller program 600 can use them; as mentioned previously, the mouse-button events may be stored as a decision tree, a set of rules, or as any other conventional structure, such as a table having addressable entries.

Blocks 720 perform conventional functions. To modify the terminal's display at 730, block 731 detects a requirement for a modification, which may have been generated by blocks 720 or by some other function. Block 732 then composes and sends a conventional data frame 733 to the particular DWS terminal being controlled by this instance of controller program 700. Periodically, the WSC sends polls 740 to the terminals. At such times, block 741 causes block 742 to generate and send a data frame 743 to the terminal.

Blocks 750 process the poll responses from the terminal. If block 751 does not detect a response within a given time interval, block takes conventional actions 752. If the response is a data frame 753 indicating a character or other standard keypress (or some other conventional condition), block 754 handles it.

But, if block 751 detects a mouse-button event in the data frame 753, block 755 selects the appropriate action, using the definitions stored by block 713, as indicated schematically by the broken line 701. Blocks 756 process the action accordingly, as, for example, described in the above table in connection with FIG. 6. Some of these actions may require the transmission of a data frame to the terminal, indicated by dashed line 702; some may require a data stream to be transmitted to the host computer, as at 703; and some require only actions within the WSC, as at 704.

Blocks 760 send a data stream to the host whenever block 761 detects that a stream must be sent, perhaps because of a mouse-button event 703 from a block 756. Block 762 composes and sends the stream 653 in a conventional manner.

Figure 8:
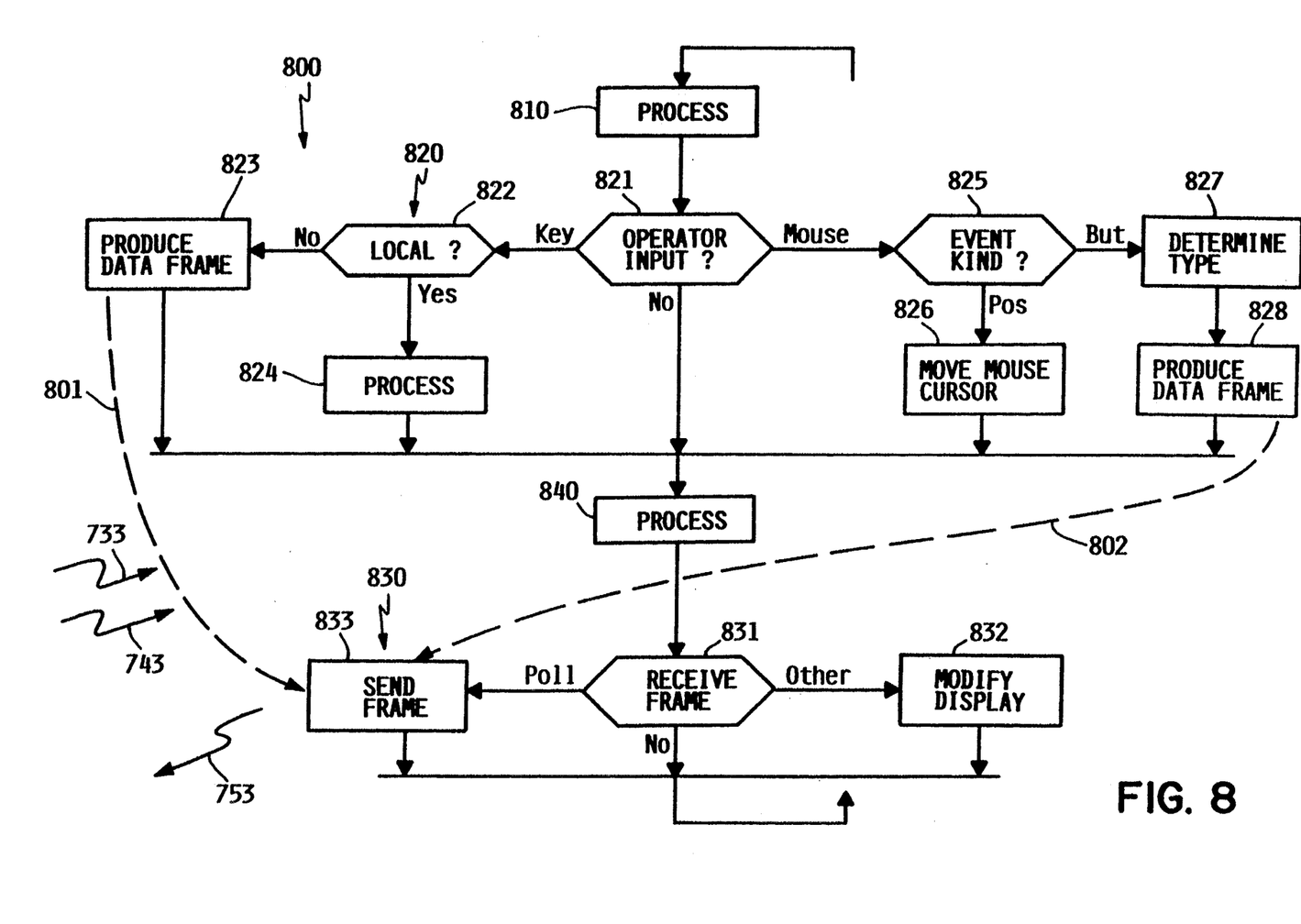
FIG. 8 is a flowchart showing the operation of an DWS, FIG. 1, in support of a mouse.

Blocks 770 perform any other processing actions within the WSC, perhaps in response to a mouse-button event, as indicated by dashed line 704. Control returns to blocks 710. WSC control program 700 is basically interrupt-driven; the major blocks 710–770 may be performed in any time sequence FIG. 8 is a flowchart 800 describing the actions occurring within a DWS terminal 100, FIG. 1.

Blocks 810 perform conventional functions. If an operator input occurs at 820, block 821 determines the appropriate action. If the input is a keypress which requires transmission to the WSC or to the main processor, block 823 produces a data frame to be sent to the WSC. If the input produces strictly local effects in the terminal, block 824 to process it in a conventional manner. The preferred embodiment does, however, add one easily implementable routine to block 824. The user can press a unique key sequence for setting the double-click time interval for the mouse. When this sequence is detected, block 824 displays a number, such as "0.5" at a particular location on the display screen. The user can press cursor up/down keys (or other keys) to increase or decrease this number by a predefined increment, such as 0.1 second. When the user presses an Enter or other key to indicate completion, block 824 stores the final number as the maximum number of seconds between button presses which will be taken as a double-click.

If the operator input is a mouse event, block 821 signals block 825 to determine its kind of event. If the event is a position event, block 826 moves the display of the mouse cursor on the screen, and records its new row/column position on the screen. (Additionally, as described below, if the WSC has indicated that periodic mouse-movement events are to be transmitted, and the period has elapsed, the current mouse row/column position is transmitted in a data frame to the WSC.) If the mouse event is a button event, block 827 determines what type of button event it is. The present implementation determines three types of button event. A "down" event occurs when the button is pressed. An "up" event occurs when the button is released. A "double click" occurs when the button is pressed and released within a predetermined time duration. The up and down events are sent when they occur, and are also stored in the DWS memory, along with time markers. If block 828 detects the sequence down/up/down where the marker for the second down is less than a certain value and the mouse position has not changed, then block 827 indicates a double-click event. Thus, a double click sends four mouse-button event frames: down, up, double-click, and up; the last up event is sent when the button is later released from the double-click. The WSC rules must be designed to decode such sequences properly; generally, any screen position is selectable by a button-down event or by a double click, but not by both. (Other embodiments, however, could process such sequences entirely within the terminal and send only a single event data frame.) Block 828 then produces a data frame indicating what the event type is, which button is, and the row/column position of the mouse cursor at the time of the button event. The table below shows the format of a mouse-button event data frame.

| Field: | Command | Button | Mouse | Row Column |
|---|---|---|---|---|
| Values: | down | left | 1 | 1 |
| | up | middle | ... | ... |
| | double-click | right | 24 | 80 |
| | movement | | | |

Additionally, when requested by the WSC, a defined "movement" command value causes the WSC to disregard the button field, and to report only the mouse row and column positions to the WSC.

In the IBM 5250 protocol, the full sequence for sending a mouse-button event from a DWS terminal at address N on a cable is:

WSC sends a poll data frame to all terminals.
Terminal N returns a poll-response data frame containing the state of the terminal. Of the two bytes of this frame, one bit, the "outstanding status" bit, has not heretofore been used for this type of terminal. The invention sets this bit to indicate that a mouse-button event is available.
WSC sends a read-command data frame addressed to a new address in terminal N, requesting it to send whatever data it has.
Terminal N transmits the above button-event data frame.

Because the outstanding-status bit value in the poll response has already told the WSC that a mouse-button event is pending, the button-event frame itself need not contain any special code identifying it as such.

Although not shown in FIG.8, some embodiments might wish to send changes in mouse position to the WSC even without a button event. As noted above, this could lead to an unacceptably high data rate between the terminals and the WSC, especially where the WSC controls a large number of terminals. However, some application programs and/or WSC operations may request movement information for short time durations for certain operations. For example, for a drag or drag/-drop function, the WSC might sense left button down with the row/column positions of a defined object such as a scroll-bar slider, and send a data frame to the DWS requesting that block 828 send a unique mouse-position data frame every 50 msec until the button is released. After the user releases the button, the WSC's receipt of a data frame indicating the release causes the WSC to send another unique frame to the DWS requesting that movement events no longer be sent.

Blocks 830 process data frames from the WSC. When 831 detects a received frame, block 832 modifies the display if required by a frame such as 733. If the frame is a poll such as 743, block 833 sends a return frame 753. This frame might have been a conventional frame produced by block 824, indicated by dashed line 801, or a mouse-button event frame from block 827, indicated by dashed line 802.

We claim as our invention:

1. A data-processing system, comprising:
a main processor for executing multiple interactive user application programs;
at least one workstation controller, including
means for coupling said workstation controller to said main processor for transferring data streams between said workstation controller and respective ones of said application programs, certain of said data streams being mouse data streams responsive to mouse-button actuations by a user and actions defined by said application programs in response to said mouse-button actuations,
memory means for storing workstation-controller data and program code,
a communications adapter for sending and receiving data frames, certain of said data frames being mouse-button-event data frames,
a microprocessor executing said workstation-controller program code for converting selected ones of said data streams into said data frames, and for converting selected ones of said mouse-button-event data frames into further ones of said data streams and transmitting them to said main processor;
a plurality of dependent workstation terminals all coupled to said one workstation controller, each of said terminals comprising
a display having specified rows and columns each capable of displaying one of a set of characters,
a keyboard for receiving individual keystrokes from a user,
a mouse having body means for producing data representing movement events and button means for producing button events when actuated by said user,
a communications adapter for sending and receiving said data frames,
a terminal microprocessor executing terminal program code for (a) processing received data frames so as to (b) display specified ones of said characters at specified rows and columns of said display, for (c) transmitting data frames representing said keystrokes, for (d) storing a current mouse position in response to said mouse-movement events, for (e) displaying on said display a mouse cursor at said mouse position directly in response to said current mouse position stored in said terminal memory means, and for (f) transmitting said mouse-button-event data frames to said workstation controller in response exclusively to said mouse-button events and not in response to said mouse-movement events, said mouse-event data frames containing both said current mouse position and an indication specifying said mouse-button event, memory means for storing said terminal program code, said terminal program code stored for at least functions (d) through (f) remaining the same with respect to all of said multiple application programs executing in said main processor wherein each of said mouse-button-event data frames contains a type of mouse-button event, and a specification of said current mouse position in terms of one of said rows and one of said columns in said display, said mouse-button-event data frames remaining the same with respect to all of said multiple application programs.

2. The system of claim 1, wherein said mouse has a plurality of individually actuable button means, and wherein said mouse-event data frames further contain a specification of which of said button means was actuated by said user.

3. The system of claim 1, wherein said workstation-controller memory contains logic specifying a set of variable actions associated with different ones of said mouse-event data frames, and wherein said workstation-controller microprocessor performs said actions in response to said data frames from said dependent terminals.

4. The system of claim 3, wherein said main processor is responsive to at least one of said application programs for sending said logic to said workstation controller in one of said mouse data streams.

5. The system of claim 3, wherein said data frames contain a type of mouse event and a specification of said current mouse position, and wherein said logic is responsive both to said event type and to the location of said current position within one of a number of predefined fields on said display.

6. The system of claim 5, wherein said fields represent rows and columns of said display in which said user may enter data.

7. The system of claim 5, wherein said fields represent rows and columns of said display containing a construct defined by a data stream from said main processor.

8. The system of claim 7, wherein said construct is a scroll bar, and wherein said action comprises moving a plurality of characters on said display to different locations on said display in response to one of said mouse-button events.

9. The system of claim 7, wherein said construct is a menu bar, and wherein said action comprises displaying a menu of characters in relation to said menu bar in response to one of said mouse-button events.

10. The system of claim 7, wherein said construct is a plurality of selection boxes, and wherein said action comprises storing a plurality of selection choices from a plurality of said data frames in said workstation-controller memory in response to a plurality of said mouse-button events.

11. The system of claim 10, wherein said workstation-controller microprocessor is responsive to a predetermined keystroke subsequent to the storing of said selection choices for sending a data stream representing all said choices to said main processor.

12. The system of claim 3, wherein said logic is stored in said workstation-controller memory independent of said application programs.

13. The system of claim 12, wherein said data frames contain a type of mouse event and a specification of said current mouse position, and wherein said logic is responsive both to said event type and to the location of said current position within one of a number of predefined fields on said display.

14. The system of claim 13, wherein a plurality of said actions cause said workstation-controller microprocessor to interpret said mouse-button events as keystrokes from said keyboard of said terminal, and to send to said main processor a data stream representing said keystrokes.

15. The system of claim 14, wherein said workstation controller microprocessor sends data streams representing different keystrokes in response to said current location specified in said data frame.

16. The system of claim 3, wherein certain of said actions are performed in said workstation controller below the level of said main processor, such that said application programs execute independently of said certain actions.

17. The system of claim 16, wherein one of said actions causes said workstation controller to transmit a designated data frame to one of said terminals, and wherein said one terminal thereafter transmits to said workstation controller a sequence of unique data frames representing said current position stored in said terminal memory.

18. The system of claim 17, wherein said one terminal transmits said unique data frames at predetermined time intervals.

19. The system of claim 17, wherein another of said actions causes said workstation controller to transmit another designated data frame to said one terminal, and wherein said one terminal thereafter transmits to said workstation controller said current position stored in said terminal memory only upon the occurrence of a mouse-button event.

20. A data-processing system, comprising:
a host processor for executing a plurality of interactive application programs; at least one communication medium; a plurality of dependent workstation terminals physically remote from said host processor and all connected thereto by said one communications medium, each said dependent workstation terminal including a display having a limited number of discrete rows and columns each capable of displaying one of a set of characters, a keyboard for receiving individual keystrokes from a user, a mouse having body means for producing data representing movement events and button means for producing button events when actuated by said user, a communications adapter for exchanging said data frames with said host processor on said one communications medium, a terminal microprocessor executing terminal program code for (a) receiving said data frames so as to (b) display specified ones of said characters at specified rows and columns of said display, for (c) transmitting data frames representing said keystrokes, for (d) storing a current mouse position in response to said mouse-movement events, for (e) displaying on said display a mouse cursor at said mouse position directly in response to said current mouse position stored in said terminal memory means, and for (f) transmitting button-event data frames to said host processor exclusively in response to said button events and not in response to said movement events, said button-event data frames containing both said current mouse position and an indication specifying said mouse-button event, memory means for storing said terminal program code, said terminal program code stored for at least functions (d) through (f) remaining the same with respect to all of said plurality of application programs executing in said main processor wherein each of said mouse-button-event data frames contains a type of mouse-button event, and a specification of said current mouse position in terms of one of said rows and one of said columns in said display, said mouse-button-event data frames remaining the same with respect to all of said plurality application programs.

21. The system of claim 20, wherein said mouse has a plurality of individually actuable button means, and wherein said mouse-event data frames further contain a specification of which of said button means was actuated by said user.

22. The system of claim 20, wherein a subset of said set of characters defines different individual parts of a construct displayable at certain row and column locations of said display.

23. A character-based dependent workstation terminal for a data-processing system having a host processor for executing a plurality of application programs and for controlling a plurality of dependent workstation terminals simultaneously by means of data frames exchanged over a single communications medium, said dependent workstation terminal comprising:
a display for displaying a plurality of individual characters from a set of characters at each of a limited plurality of locations;
at least one enclosure physically separate and remote from said host processor;
a communications adapter coupled to said single communications medium;
a keyboard for receiving individual keystrokes from a user;
a mouse movable by said user for producing data representing mouse-movement events, and containing at least one button actuable by said user for producing data representing mouse-button events;
a terminal microprocessor executing terminal program code for (a) receiving said data frames from said host processor and (b) displaying characters represented therein at locations specified in said data frames, for (c) sending said individual keystrokes in to said host processor, for (d) storing in said memory means a current location of said mouse in response to said data representing said mouse-movement events, for (e) displaying on said display a mouse cursor at said mouse position directly in response to said current mouse position stored in said terminal memory means, and for (f) sending mouse-button-event data frames encoding said mouse-button events and said current mouse position exclusively in response to said data representing said mouse-button events and not in response to said mouse-movement events;
memory means for storing said terminal program code, said terminal program code stored for at least functions (d) through (f) remaining the same with respect to all of said plurality of application programs executing in said main processor wherein each of said mouse-button-event data frames contains a type of mouse-button event, and a specification of said current mouse position in terms of one of said rows and one of said columns in said display, said mouse-button-event data frames remaining the same with respect to all of said plurality application programs.

24. The terminal of claim 23, wherein said limited plurality of locations are rows and columns on said display.

25. The terminal of claim 24, wherein one character of said set is a mouse cursor, and wherein said terminal microprocessor is responsive to said current location in said terminal memory to display said mouse cursor on said display at a row and column location specified by said current position.

26. The terminal of claim 24, wherein one character of said set is a text cursor, and wherein said terminal microprocessor displays said text cursor at a row and column location on said display specified by one of said data frames received from said host processor.

27. The terminal of claim 26, wherein another, different character of said set is a mouse cursor, and wherein said terminal microprocessor is responsive to said current location in said terminal memory to display said mouse cursor on said display at a row and column location specified by said current position.

28. The terminal of claim 23, wherein said mouse-event data frames represent a press, a release, and a click of said button means.

29. The terminal of claim 23, wherein said mouse-event data frames further represent a double click of said button means.

30. The terminal of claim 29, wherein said terminal microprocessor is responsive to a predetermined sequence of said keystrokes from said keyboard to set a maximum time interval representing a double click.

31. The terminal of claim 23, wherein said mouse has a plurality of said buttons, and wherein each of said mouse-event data frames contains a designation specifying one of said buttons.

32. The terminal of claim 23, wherein said terminal microprocessor is responsive to a predetermined one of said data frames from said host processor thereafter to transmit to said host processor a sequence of unique data frames representing said current position stored in said terminal memory.

33. The terminal of claim 32, wherein said one terminal transmits said unique data frames at predetermined time intervals.

34. The terminal of claim 33, wherein another of said actions causes said host processor to transmit another designated data frame to said one terminal, and wherein said one terminal thereafter transmits to said host processor said current position stored in said terminal memory only upon the occurrence of a mouse-button event.

* * * * *